Feb. 3, 1953     HIROKI KAJIYAMA     2,627,572
TEMPERING APPARATUS FOR MAKING BAND SAWS OR THE LIKE
Filed Jan. 17, 1952
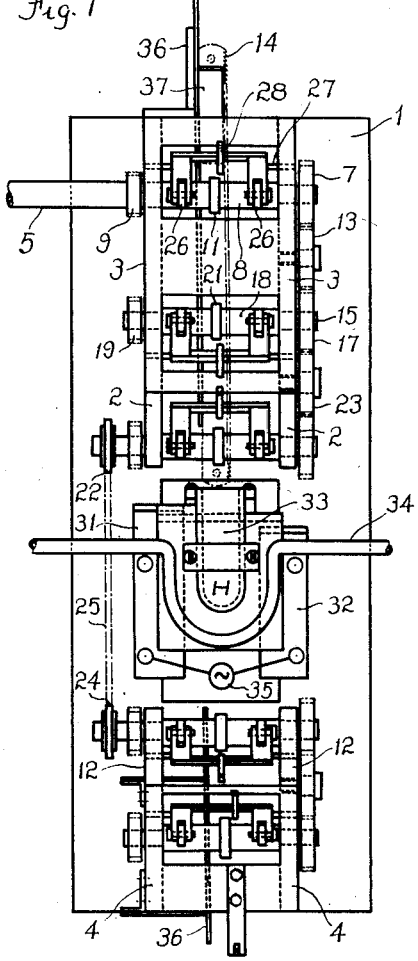
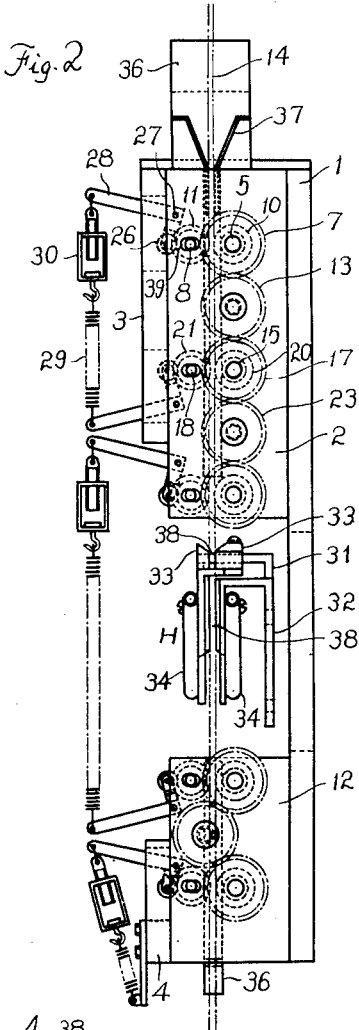
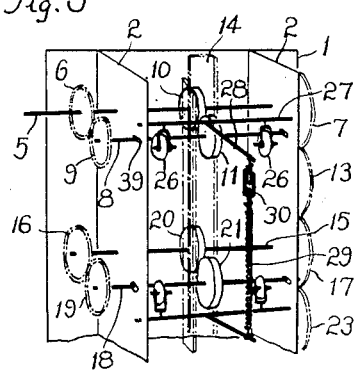
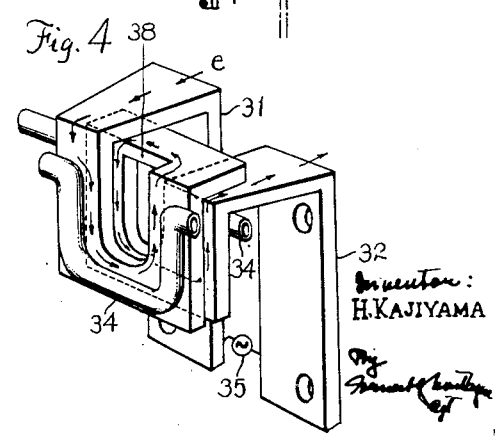
Inventor:
H. KAJIYAMA Patented Feb. 3, 1953

2,627,572

UNITED STATES PATENT OFFICE 2,627,572

TEMPERING APPARATUS FOR MAKING BAND SAWS OR THE LIKE

Hiroki Kajiyama, Kure City, Hiroshima-Ken, Japan

Application January 17, 1952, Serial No. 266,819

1 Claim. (Cl. 219—47)

The present invention relates to an apparatus for hardening or tempering iron strips or bands to make band saws for metal bars, pipes, plates and the like.

According to the invention, not only band saws for metal- or alloy-sawing but also files or the like may be obtained.

An embodiment of apparatus for tempering iron band in accordance with the present invention will be illustrated in the accompanying drawings, where Figure 1 shows its front elevation, Fig. 2 its side elevation, Fig. 3 schematically illustrated perspective view of its upper portion, and Fig. 4 the enlarged perspective view of the high frequency electric current induction device, designated by H in Fig. 2, insulator being removed in order to disclose clearly the electric circuit.

In the drawings, 1 denotes a table plate, 2 and 12 side plates, 3 a rectangle shaped frame mounted on the side plates 2 and 2 and 4 a U-shaped frame mounted on the side plates 12 and 12. A main shaft is borne at its end in openings bored through the side plates 2 and 2. Toothed wheels 6 and 7 are fixed to the main shaft 5. Another shaft is borne at both ends in elliptical openings 39 bored through the side plates 2 and 2, aligning with the said shaft 5. A toothed wheel 9 is fixed at one end of the shaft 8 and gears with the said toothed wheel 6. Rollers 10 and 11 are fixed to the said shafts 5 and 8 respectively so as to keep enough aperture between themselves to receive an iron band 14 to be tempered.

When the main shaft 5 is driven by an electric motor (not shown in the drawings), the toothed wheel 6 and the roller 10 rotates in one direction while the toothed wheel 9 and the roller 11 rotates in opposite direction, thus the pair of rollers 10 and 11 moving the iron band 14 downwards.

The apparatus in accordance with this invention has several devices similar to that above explained, consisting of the rollers 10 and 11, the toothed wheels 6 and 9 and the shafts 5 and 8. In the drawings five similar devices are shown.

A shaft 15 which is driven by means of toothed wheels 17, 13 and 7, geared in turn, corresponds to the shaft 5 and a toothed wheel 16 corresponds to the toothed wheel 6. Another toothed wheel 19 corresponds to the toothed wheel 9 while a shaft 18 corresponds to the shaft 8. A pair of rollers 20 and 21, which correspond to those 10 and 11 respectively, move the iron band 14 downwards in co-operation with the pair of rollers 10 and 11. Driving action of the shaft 15 of the second device above illustrated is transmitted to the shaft of the third similar device by a toothed wheel corresponding to the toothed wheel 13. The driving action of the third device is then transmitted to the shaft of the fourth similar device by means of a chain 25 belting over toothed wheels 22 and 24. Transmission of driving action from the fourth device to the fifth device is conducted by a toothed wheel similar to 17 or 7. Thus the iron band moving action is co-operated by five pairs of rollers including the pair of 10 and 11 as well as the pair of 20 and 21.

The shaft 18 is borne at both ends in elliptical openings similar to 39. That is quite similar in the third, fourth and fifth device.

The elliptical openings admit the iron band, thinner or thicker, to be held between the pairs of rollers 10 and 11, 20 and 21 and the like, the pressing actions being exerted by pairs of pressing rollers 26 and 26 attached at both ends of levers consisting of shafts 27 and arms 28, the latter being pulled elastically by means of springs 29 and turnbuckle 30.

Between the third and fourth device aforesaid, a high frequency electric current induction device H is located as shown in Fig. 1 and Fig. 2. Its construction may be more easily understood by observing Fig. 4 where both leg portions of the device are denoted by 31 and 32, cooling pipes by 34 and 34, and a source of high frequency electricity by 35. High frequency electric current circulates in the direction of arrows indicated by e through the conductor wound and bent as shown in Fig. 4 and its both ends 31 and 32 to heat the iron band 14 moving through the passage 33 covered with heat-resisting insulators 33 and 33, not shown in Fig. 4 but shown in Fig. 2 and Fig. 1.

As illustrated in Fig. 2 and Fig. 1, the iron band 14 is supplied between guiding plates 37 and 37, pulled downwards by several pairs of rollers 10 and 11 as well as 20 and 21 and the like, meanwhile held in position by deviation-preventing plate 36, heated at the temperature of about 800° C. to be tempered, guided by another deviation-preventing plate 36 and discharged from the final pair of rollers acting similarly to those 10 and 11 or 20 and 21, the heated iron band entering into a quenching oil bath not shown in the drawings to be tempered.

According to the present invention iron band or strip to be tempered or hardened may be moved through a definite and accurate passage in a high frequency electric current induction device to be heated at its predetermined portion and at the optimum temperature and in a predetermined grade along its lengthwise direction, by means of said several pairs of holding rollers driven in equal velocity, said pairs of pressing rollers in concert with said elliptical openings, and said deviation-preventing plates, thus always evenly tempered or hardened saws or the like being obtained.

It is to be understood that the invention is not limited to the specific embodiment herein shown and described, but may be carried out in other ways without departure from its spirit.

What I claim as new and desire to secure by Letters Patent of the United States is:

A tempering apparatus for making band saws or the like using a high frequency electric current induction device, characterized by the fact that an iron band to be treated for making a saw or the like is pulled downwards, successively and equally, by several pairs of rollers, a roller of each pair is pressed against the other roller respectively by means of pressing rollers attached at forked ends of a lever pulled at the other end thereof by a spring and a turnbuckle in concert with elliptical openings bearing the shaft of said pressing rollers, a high frequency electric current induction device is located between the upper group of said band pulling devices and the lower group of those in order to heat evenly the moving band, and deviation-preventing plates guide the moving band in position.

HIROKI KAJIYAMA.

REFERENCES CITED

The following references are of record in the file of this patent:

UNITED STATES PATENTS

| Number | Name | Date |
|---|---|---|
| 2,479,949 | MacPheat | Aug. 23, 1949 |
| 2,525,203 | Bostroem | Oct. 10, 1950 |
| 2,526,518 | Turrettini | Oct. 17, 1950 |

FOREIGN PATENTS

| Number | Country | Date |
|---|---|---|
| 620,432 | Great Britain | Mar. 24, 1949 |